United States Patent Office 3,816,474
Patented June 11, 1974

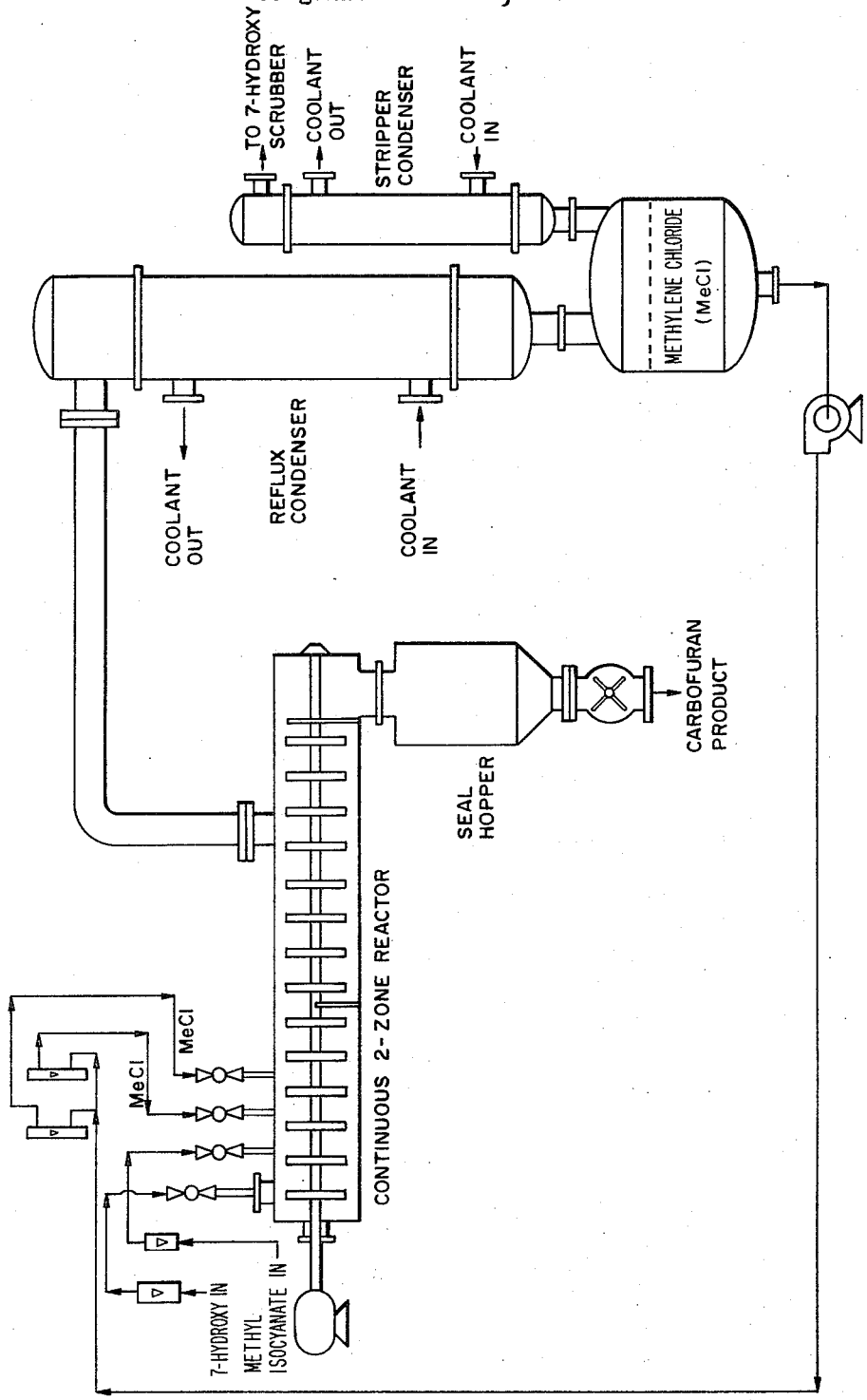

3,816,474
PROCESS FOR PRODUCTION OF CARBOFURAN
Dean F. Thorpe, Weston, Conn., assignor to FMC Corporation, New York, N.Y.
Continuation of abandoned application Ser. No. 846,069, July 30, 1969. This application June 5, 1972, Ser. No. 260,018
Int. Cl. C07d 5/36
U.S. Cl. 260—346.2 R 5 Claims

ABSTRACT OF THE DISCLOSURE

Production of solid addition products of the type $A+B=A.B+$heat, and specifically the production of 2,3-dihydro - 2,2 - dimethyl-7-benzofuranyl methylcarbamate (carbofuran) from 2,3-dihydro-7-hydroxy-2,2-dimethyl-benzofuran (7-hydroxy) and methyl isocyanate, is described. In the process the raw materials are fed into a reaction zone capable of producing intensive mixing in the presence of a small quantity of a very volatile liquid which is non-reactive in the process, and has a high order of volatility, preferably as great as or not much lower than the methyl isocyanate—for example, methylene chloride. Once the exothermic reaction is initiated, cooling is effected by vaporization of the added liquid and unreacted isocyanate. The volatiles are condensed and returned to the process until the reaction is completed. Thereafter, the return of condensate is stopped so that in a very short time a dry powdered product is obtained. The process is characterized by very short processing times.

CROSS REFERENCE TO RELATED APPLICATIONS

This is a continuation of application Ser. No. 846,069 filed July 30, 1967 now abandoned. This application is an improvement on the process disclosed in application SN 809,394 filed Mar. 21, 1969 now abandoned and of common ownership with this application.

BACKGROUND OF THE INVENTION—FIELD OF THE INVENTION

There are a number of exothermic addition reactions in organic chemistry, in which a reactant A can be reacted with a second reactant B (or with several reactants, e.g., B and C) to produce an addition product AB which is solid. In some cases, the reaction can be run in melt form, because the reaction proceeds at the melting point of the product in much the same fashion as it does at lower temperatures, and despite the exotherm, it is possible to control the molten reaction by conventional heat exchange techniques. However, many such reactions cannot be run in the melt form, because at melt temperatures side reactions occur which substantially reduce the yield of desired product, and contaminate the product so that purification, with attendant loss of yield and increased cost, is necessary. Such reactions are conventionally run either in solution or in suspension, in some diluent vehicle, so that the reaction can be carried out at low temperatures, and the product is separated from the vehicle and purified as needed.

A typical reaction of this type is that between phenols or alcohols and isocyanates to produce carbamates. When such reactions are run in the molten stage by the reaction of, for example, a phenol, a catalyst, and methyl isocyanate, there are produced not only the desirable carbamates but also other materials; for example, the following reactions can occur:

(1) $ArOCONHCH_3 + ArOH \rightarrow ArOCOOAr + CH_3NH_2$ (2) $ArOCONHCH_3 + CH_3NCO \rightarrow$
$ArOCON(CH_3)CONHCH_3$ (3) 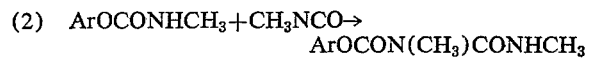 $nCH_3NCO \rightarrow (CH_3NCO)_n$ A specific example of the above reaction is that between 2,3-dihydro - 7 - hydroxy-2,2-dimethylbenzofuran (7-hydroxy) and methyl isocyanate to produce the very valuable pesticide carbofuran (2,3-dihydro-2,2-dimethyl-7-benzofuranyl methylcarbamate).

In Pelley et al. application SN 809,394 filed Mar. 21, 1969 now abandoned there is disclosed a method for conducting reactions of this type in which the reactants are fed into a reaction zone which is vigorously agitated with sufficient power to keep the product of the reaction broken up into powder form. The solid reaction product acts as a diluent for the material, and helps in preventing the building up of heat. The process is ordinarily run as a batch process using a heavy-duty intensive mixer, such as a horizontal sigma blade mixer or a Banbury mixer. It can also be run continuously by operating a heavy-duty intensive mixer in a reaction trough using, for example, a screw with blades which are pitched so that the reaction is completed during the time it takes the products to go through the mixer.

This process works very well indeed in the laboratory, and in medium-size plant equipment. However, when large-size equipment is used the necessity for removing large heats of reaction quickly from the exothermic reaction make it necessary to use especially designed equipment; it is desirable, for example, to use internally cooled mixer blades as well as large external cooling jackets. This increases the capital expenditure necessary if high throughput is to be obtained. Alternatively, it is necessary to slow down the reaction by reducing the throughput to assure adequate heat transfer. The important point with the product carbofuran is that temperatures in excess of 140° C. must be avoided if decomposition of the product is to be prevented. It is difficult to maintain temperatures below 140° C. in large-scale reactors in the absence of adequate cooling.

Running the process with an excess of methyl isocyanate does not solve the problem, since any substantial excess of the reagent causes considerable difficulties because of the instability of methyl isocyanate and the tendency for the second molecule of isocyanate to react with the previously formed carbofuran (equation 2) giving a contaminated product.

This invention aims to provide a process for producing pure carbofuran and similar reaction products, which process is capable of being run in standard heavy-duty mixers without any danger of overheating from the exotherm.

SUMMARY OF THE INVENTION

In accordance with the present invention, I react 2,3-dihydro-7-hydroxy-2,2-dimethylbenzofuran (7-hydroxy) with methyl isocyanate to produce carbofuran by reacting the ingredients in roughly stoichiometric proportions in a high intensity mixing zone in the presence of a small quantity of an organic liquid with a boiling point of about 80° C. or lower, and a heat of vaporization of about 40 calories per gram or higher, initiating the reaction to produce an exotherm, generally by the use of a catalyst, such as triethylamine, which rapidly induces the exothermic reaction at ambient temperatures. The rate of reaction and temperature of the reaction mixture is controlled in large measure by volatilizing the inert liquid, together with unreacted isocyanate, condensing the volatiles and returning them to the reaction zone until the reaction is essentially complete, and thereafter continuing the volatilization of the inert liquid without returning it to the reaction zone, so that a dry powdered carbofuran free of diluent is obtained. The reaction products are subject to intensive mixing throughout the course of the reaction, so that the finished product is in dry powdered form.

The process is applicable to similar reactions such as the production of the insecticides 1-naphthyl methylcarbamate (Sevin) and o-isopropoxyphenyl methylcarbamate (Baygon), or the reactions between aromatic amines and diketene to produce acetoacetanilides.

DETAILED DESCRIPTION OF THE INVENTION

As described above, the invention is concerned with exothermic organic reactions to produce a solid end product which are conventionally run in diluents rather than as melts because of undesirable side reactions which occur if the exotherm is allowed to increase the temperature beyond the safe range. This type of reaction is exemplified as indicated above by the production of the insecticides carbofuran, 1-naphthyl methylcarbamate, and o-isopropoxyphenyl methylcarbamate, and the production of acetoacetanilides from aromatic amines and diketenes.

In operating in accordance with the present invention the reactants together with diluent are introduced into an intensive mixing zone. When operating batch-wise, the materials are fed into any intensive mixer such as a horizontal sigma blade mixer or a Banbury mixer. When operating continuously, the mixer is preferably a reaction trough with a screw mixer in it which advances the product at a rate sufficiently slow so that the reaction is complete before discharge, and is preferably divided by a dam into two zones. In either type of reactor the reactants are fed into the reaction zone in the presence of an auxiliary liquid as diluent. In the manufacture of carbofuran, for example, 2,3-dihydro-7-hydroxy-2,2-dimethyl-benzofuran (hereinafter called "7-hydroxy") and methyl isocyanate are fed into the reactor together with an inert liquid which has a boiling point from just below that of methyl isocyanate to roughly 80° C. The reaction is preferably initiated by the use of a small amount of a known catalyst for the reaction, e.g. triethylamine, which induces an exotherm at ambient temperatures. Approximately stoichiometric equivalents of the two products are used, e.g. 58 pounds of 7-hydroxy to 22 pounds of methyl isocyanate, or a very slight excess (5% to 10%) of isocyanate is used. There is added to the mixture a non-reactive diluent liquid in amount sufficient, by removal of heat through its vaporization, to maintain the reaction temperature at the desired level. In general, from about 10% to 40% of diluent based on total batch weight is used. The amount actually used depends on the heat of vaporization; it is selected so that when the reaction is complete, the sensible heat left in the batch is more than sufficient to volatilize the remaining diluent liquid.

During the early stages of reaction, the methyl isocyanate and the diluent are evaporated off, thereby controlling the exotherm. They are condensed and the condensate is returned through a line into the reactor until the reaction is completed. The rate of circulation of diluent will determine the temperature of the reaction mixture. Thereafter the return line from the condenser is shut off and the reaction is continued for a few minutes until all of the diluent is removed by the sensible heat left in the reaction mix, with the result that a dry powdered product is delivered from the mixer.

In the case of a continuous mixer the elongated trough is divided into two compartments, a reaction compartment and a finishing compartment. Return lines from the condenser are provided to a plurality of points in the reaction compartment, but no return is provided in the finishing compartment, thus providing the same result of obtaining a dry product free of diluent. In such a device, the finishing compartment is about as large as the reaction compartment, to insure adequate time for removal of diluent.

As indicated above, the reaction may be initiated simply by mixing the 7-hydroxy and the methyl isocyanate at about 50° C., but the reaction is too slow to be economic. For economic reaction times, the reaction is initiated at ambient temperatures, by the use of small quantities of a standard catalyst, such as triethylamine, other tertiary amines, dibutyltin salts such as the diacetate and dilaurate, and potassium $t$-butoxide. The amount of catalyst needed is relatively low—from about 0.1% to 0.5% is generally sufficient to insure a high reaction rate.

The diluent used in the reaction may be any liquid which is not reactive with the product, which has a sufficiently high heat of vaporization, desirably at least 40 calories per gram, to act effectively to control the exotherm and temperature of the reaction mixture when used in sufficiently low quantity so that it can readily be flashed off at the end of the reaction, and which has a boiling point not in excess of about 80° C. Suitable liquids include hydrocarbons such as benzene, cyclohexane, methyl cyclopentane, pentane and hexane, chlorinated hydrocarbons such as the preferred solvent methylene chloride, carbon tetrachloride and chloroform, and others such as ethyl isobutyl ether.

It would be expected that the addition of the diluent would slow down the reaction as compared with higher temperature reactions which occur in the absence of diluent. Surprisingly, the use of the diluent not only keeps the maximum temperature down, which would be expected to further slow the reaction, but quite unexpectedly produces a completed reaction in roughly half the time required in the absence of diluent. For example, a series of batches were produced in which product was fed into a Littleford-Loudige mixer (model FM 130 D) equipped with jacket cooling. A series of four trials was run, using about 60–65 pounds of four different batches of 7-hydroxy and from 5% to 10% stoichiometric excess of methyl isocyanate and 0.4% of batch weight of triethylamine. The maximum temperatures reached at the height of the exotherm varied from about 134° to 138° C. and the reaction time ranged from 60 to 65 minutes with yields approaching stoichiometric, and assays of the order of 93–95% on the technical product produced. In a similar series of 14 batches run with similar weights of 7-hydroxy from various batches, methyl isocyanate and catalyst and with from about 10 to about 25 pounds of methylene chloride, the maximum temperature reached varied from about 85° C. to about 130° C. with the bulk of the maximums about 100–110° C. The reaction product was obtained in similar quantities and at a slightly better percentage of purity than in the absence of diluent. Surprisingly, however, the reaction times instead of averaging about 60–65 minutes, ranged from about 20 to about 40 minutes, with an average of about 35 minutes.

THE DRAWING

The drawing is a diagrammatic flow sheet illustrating the continuous practice of the present invention.

PREFERRED EMBODIMENTS OF THE INVENTION

The following specific examples are given by way of illustration and not by way of limitation of the invention.

Example 1.—Continuous process

An elongated screw mixer was provided as shown in the attached diagrammatic flow sheet, which was designed to produce 900 pounds per hour of carbofuran (4.072 pound moles per hour). There was fed to the reactor 668 pounds per hour (11.13 per minute) of 7-hydroxy, mixed with 2.5 pounds per hour of triethylamine catalyst, and 244 pounds per hour (4.05 per minute) of methyl isocyanate; this provided a 5% excess of isocyanate. The initial feed of methylene chloride liquid diluent was roughly 1 gallon per minute, sufficient to remove about 70% to 80% of the heat of reaction. As the reactor filled up, the feed rate was adjusted to maintain a temperature of 80° C. in the vapor feed into the reflux condenser.

The temperature of the reaction mass was thereby retained at about 100–120° C. By using about half of the reactor length as a drying zone, dry powdered product, free of excess isocyanate and methylene chloride, was obtained at the discharge end of the mixer. Holdup time in the reactor is about an hour.

Example 2.—Batch operation for production of carbofuran

In a reaction vessel equipped for good agitation and for recycling methylene chloride (the specific vessel employed with a Littleford-Loudige model FM 130 D mixer) was added 66 pounds of 7-hydroxy (the 7-hydroxy used assayed 12% carbofuran, that carbofuran having been produced in the scrubber where the 7-hydroxy had been used as absorber; thus 58.1 pounds of 7-hydroxy was actually added) containing about 0.25 pounds (0.4%) of triethylamine, and 17.75 pounds of methylene chloride. The vessel was closed, agitators started, and during 30 minutes was added 22.2 pounds (a 10% excess) of methyl isocyanate (MIC). The initial temperature of the reaction mixture was 20°; fifteen minutes after addition was started, the temperature was 71° C., and 25 minutes after addition was started, the temperature was 100° C. When all MIC had been added, mixture temperature was 90° C.

Stirring was continued five minutes after all MIC had been added. The product was dumped from the reactor (temperature was 85° C.) to obtain 87.25 pounds (79.35 actually produced in the run) of carbofuran which assayed 96.8%.

Obviously, these examples can be multiplied indefinitely without departing from the scope of the invention as defined in the claims.

What is claimed is:

1. An improved method of making carbofuran by the catalyst-initiated reaction of 2,3-dihydro-7-hydroxy-2,2-dimethylbenzofuran with methyl isocyanate in proportions roughly from stoichiometric to a slight excess of methyl isocyanate in an intensive mixing zone wherein the improvement comprses
    (a) adding to the reaction mixture a small quantity of an inert organic diluent which is liquid under ordinary ambient conditions and has a boilng point not above 80° C. and a heat of vaporization of at least 40 calories per gram;
    (b) controlling the exotherm by condensing the diluent and unreacted isocyanate which have been volatilized by the heat of reaction and returning them to the reaction zone at a rate such that the reaction temperature is maintained at 85° C. to 130° C.;
    (c) when the reaction is essentially complete, shutting off the return from the condenser to the reaction zone and continuing the volatilization of the diluent by the sensible heat in the reaction mixture; and
    (d) recovering carbofuran as a dry powder, free of diluent.

2. The method of claim 1 in which 10–40% of diluent based on total batch weight is used.

3. The method of claim 2 in which the diluent is methylene chloride.

4. The method of claim 3 in which the catalyst is triethylamine and in which the reaction mixture is maintained at 90° C. to 120° C.

5. In a batch operation for the preparation of carbofuran by the catalyst-initiated reaction of 2,3-dihydro-7-hydroxy-2,2-dimethylbenzofuran with methyl isocyanate in proportions roughly from stoichiometric to a slight excess of methyl isocyanate in an intensive mixing zone, the improvement which comprises
    (a) adding to the reaction mixture 10–40% based on total batch weight of methylene chloride;
    (b) using the heat of reaction to volatilize the methylene chloride, together with unreacted methyl isocyanate;
    (c) controlling the exotherm by condensing the volatiles and recirculating condensed volatiles to the reaction zone at a rate such that the reaction temperature is maintained at 85° C. to 130° C.;
    (d) when the reaction is essentially complete, shutting off the return from the condenser to the reaction zone;
    (e) using the sensible heat in the reaction mixture to continue volatilization of the methylene chloride; and
    (f) recovering carbofuran as a dry powder, free of methylene chloride.

References Cited

UNITED STATES PATENTS

| | | | |
|---|---|---|---|
| 3,356,690 | 12/1967 | Orwoll | 260—346.2 |
| 3,274,238 | 9/1966 | Kojer | 260—497 |

FOREIGN PATENTS 1,457,883  11/1966  France.

OTHER REFERENCES

Vogel, Practical Organic Chemistry, N.Y., John Wiley (1956), p. 692.

HENRY R. JILES, Primary Examiner

B. DEATZ, Assistant Examiner

U.S. Cl. X.R.

260—700